(12) United States Patent
Blondin et al.

(10) Patent No.: US 10,809,856 B2
(45) Date of Patent: Oct. 20, 2020

(54) WRISTWATCH-TYPE ELECTRONIC DEVICE WITH CONTACTLESS CONTROL INTERFACE, AND CONTROL METHOD FOR SUCH A DEVICE

(71) Applicant: QUICKSTEP TECHNOLOGIES LLC, Wilmington, DE (US)

(72) Inventors: Christophe Blondin, Valleiry (FR); Didier Roziere, Nimes (FR)

(73) Assignee: QuickStep Technologies LLC, Wilmington, DE (US)

(*) Notice: Subject to any disclaimer, the term of this patent is extended or adjusted under 35 U.S.C. 154(b) by 0 days.

(21) Appl. No.: 15/122,624

(22) PCT Filed: Mar. 16, 2015

(86) PCT No.: PCT/EP2015/055431
§ 371 (c)(1),
(2) Date: Aug. 30, 2016

(87) PCT Pub. No.: WO2015/144474
PCT Pub. Date: Oct. 1, 2015

(65) Prior Publication Data
US 2017/0068352 A1 Mar. 9, 2017

(30) Foreign Application Priority Data
Mar. 28, 2014 (FR) .................................. 14 52744

(51) Int. Cl.
*G06F 3/044* (2006.01)
*G04G 21/08* (2010.01)
(Continued)

(52) U.S. Cl.
CPC ............. *G06F 3/044* (2013.01); *G04G 21/04* (2013.01); *G04G 21/08* (2013.01); *G06F 1/163* (2013.01);
(Continued)

(58) Field of Classification Search
CPC ........ G06F 3/044; G06F 3/0346; G06F 1/163; G06F 1/1605; G04G 21/08; G04G 21/04
See application file for complete search history.

(56) References Cited

U.S. PATENT DOCUMENTS 5,844,506 A 12/1998 Binstead
6,477,117 B1 11/2002 Narayanaswami et al.
(Continued)

FOREIGN PATENT DOCUMENTS

EP 1 079 325 A1 2/2001
EP 2 267 791 A2 12/2010
(Continued)

*Primary Examiner* — Alexander Eisen
*Assistant Examiner* — Kebede T Teshome
(74) *Attorney, Agent, or Firm* — Kubota & Basol LLP

(57) ABSTRACT

The present invention relates to an electronic device intended to be worn secured to a part of the human body, comprising a case (11) provided with a display zone (13), a wristband (12), and a control interface with capacitive measuring electrodes (14, 15, 16) arranged to detect control objects, said control interface being arranged so as to allow the detection of control objects (21) in contact with or across from (i) a detection zone superimposed on the display zone (13), (ii) at least one other detection zone (17, 18, 23) outside said display zone (13).
The invention also relates to a method implemented in this device.

17 Claims, 2 Drawing Sheets

Figure 1:
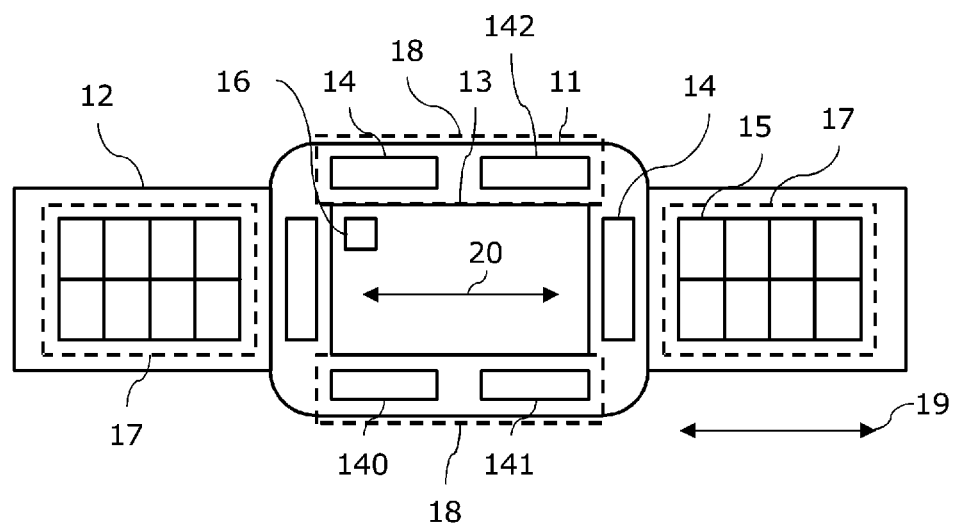

(51) Int. Cl.
*G06F 1/16* (2006.01)
*G06F 3/01* (2006.01)
*G04G 21/04* (2013.01)
*G06F 3/0346* (2013.01)

(52) U.S. Cl.
CPC .............. *G06F 1/169* (2013.01); *G06F 3/017* (2013.01); *G06F 3/0346* (2013.01); *G06F 1/1605* (2013.01)

(56) References Cited

U.S. PATENT DOCUMENTS

| | | | |
|---|---|---|---|
| 6,847,354 | B2 | 1/2005 | Vranish |
| 7,570,064 | B2 | 8/2009 | Roziere |
| 8,149,002 | B2 | 4/2012 | Ossart et al. |
| 8,159,213 | B2 | 4/2012 | Roziere |
| 8,770,033 | B2 | 7/2014 | Roziere |
| 8,917,256 | B2 | 12/2014 | Roziere |
| 9,035,903 | B2 | 5/2015 | Binstead |
| 2006/0097733 | A1 | 5/2006 | Roziere |
| 2008/0284261 | A1 | 11/2008 | Andrieux et al. |
| 2009/0059730 | A1* | 3/2009 | Lyons ............... G04G 21/08 368/69 |
| 2010/0052700 | A1 | 3/2010 | Yano et al. |
| 2010/0112964 | A1* | 5/2010 | Yl; Kyung-Hack ............ G04G 9/0064 455/90.3 |
| 2011/0169783 | A1 | 7/2011 | Wang et al. |
| 2012/0044662 | A1 | 2/2012 | Kim et al. |
| 2012/0075238 | A1* | 3/2012 | Minami ............... G06F 3/044 345/174 |
| 2012/0099406 | A1* | 4/2012 | Lau ............... G04G 21/08 368/69 |
| 2012/0187965 | A1 | 7/2012 | Roziere |
| 2012/0188200 | A1 | 7/2012 | Roziere |
| 2013/0135247 | A1 | 5/2013 | Na et al. |
| 2013/0307776 | A1 | 11/2013 | Roziere |
| 2014/0132335 | A1 | 5/2014 | Rauhala et al. |
| 2014/0171156 | A1* | 6/2014 | Pattikonda ......... H04M 1/6041 455/569.1 |
| 2014/0375577 | A1* | 12/2014 | Yeh ............... G06F 3/0416 345/173 |
| 2015/0002440 | A1* | 1/2015 | Huang ............... G06F 3/044 345/174 |
| 2015/0035792 | A1 | 2/2015 | Roziere et al. |
| 2015/0091790 | A1* | 4/2015 | Forutanpour ......... G06F 3/011 345/156 |
| 2015/0186092 | A1* | 7/2015 | Francis ............... G06F 3/1423 345/520 |
| 2015/0346026 | A1* | 12/2015 | Maass ............... G01J 1/0242 250/206 |

FOREIGN PATENT DOCUMENTS

| | | |
|---|---|---|
| FR | 2756048 A1 | 5/1998 |
| WO | WO-2013/093326 A1 | 6/2013 |

* cited by examiner

WRISTWATCH-TYPE ELECTRONIC DEVICE WITH CONTACTLESS CONTROL INTERFACE, AND CONTROL METHOD FOR SUCH A DEVICE

CROSS-REFERENCE TO RELATED APPLICATIONS

This application is a National Phase application under 35 U.S.C. § 371 of International Application No. PCT/EP2015/055431, filed Mar. 16, 2015, which claims the priority benefit of French Application No. 1452744, filed Mar. 28, 2014, the contents of which are hereby incorporated by reference in their entireties for all intended purposes.

TECHNICAL DOMAIN

The present invention relates to an electronic device intended to be worn secured to part of the human body, for example of the wristwatch type, provided with an interface allowing control with and without contact. It also relates to a method for controlling such a device.

The field of the invention is more particularly, but without limitation, that of devices comprising a touch-sensitive human-machine interface, and implementing a capacitive detection technology.

STATE OF THE ART

Portable apparatuses provided with touch-sensitive interfaces are well known. These in particular include computers with a touchscreen, smartphones and tablets.

In general, they comprise a control interface superimposed on a display screen that makes it possible to interact directly (with a control object such as a finger or a stylus) with displayed information or elements.

The control interfaces most often use capacitive technologies. They comprise electrodes positioned in the form of rows and columns, or in a matrix. The presence of control objects disrupts the electric field lines around these electrodes, which makes it possible to detect them.

Certain measuring methods make it possible to obtain high enough sensitivities to detect control objects in a vicinity of the electrodes, at a distance from and without contact with the surface of the control interface.

For example, patent FR 2,756,048 is known, which describes a solution for measuring capacitance making it possible to detect the spatial position of a finger up to several centimeters away from the measuring electrodes.

These are referred to as touch-sensitive and contactless interfaces.

These interfaces are well suited to controlling devices whereof the size of the display screen (and therefore the size of the control interface) is approximately several inches on the diagonal, given the size of a user's fingers.

Devices have more recently appeared of the wristwatch type equipped with touch-sensitive interfaces. This primarily involves terminals connected to a smartphone or tablet by a wireless link, and intended to be worn on the wrist, like a wristwatch.

These "satellite" devices make it possible to offload certain functionalities of the "primary" device (for example, a smartphone) so as to be able to access them without having to interact directly with the primary device. This in particular includes selecting music, or reading e-mails.

The display zone of these "satellite" devices is necessarily reduced, to allow wearing on the wrist. Displays are for example found with a diagonal of approximately 1.8 inches (less than 5 cm).

For their control, they are also equipped with a touch-sensitive interface superimposed on the display screen.

However, the limited size of the display makes them difficult to control. Indeed, placing a finger on the screen conceals a large part of that screen, and the virtual controls are necessarily small and therefore difficult to target.

Furthermore, the control interface (the touch-sensitive pad) and the control software are for the most part similar to those used in larger devices. They are therefore not well suited to the specificities of the use of these miniaturized satellite systems.

The present invention aims to propose a device of the wristwatch type equipped with a touch-sensitive interface that allows better control than the devices of the prior art.

The present invention also aims to propose a device of the wristwatch type equipped with a touch-sensitive and contactless interface that makes it possible to keep better visibility of the display screen during the performance of control actions.

The present invention also aims to propose a method for controlling such a device that allows easier and more effective control thereof.

The present invention also aims to propose a method for controlling such a device that introduces control possibilities specifically adapted to wearing the device on the wrist.

DESCRIPTION OF THE INVENTION

This aim is achieved with an electronic device intended to be worn secured to a part of the human body (such as a wrist), comprising a case provided with a display zone, a wristband, and a control interface with capacitance-measuring electrodes arranged to detect control objects, characterized in that said control interface is arranged so as to allow the detection of control objects:
 in contact with a detection zone superimposed on the display zone,
 in contact with or across from at least one other detection zone outside said display zone.

According to embodiments, the device according to the invention may further comprise:
 measuring electrodes positioned on the case outside the display zone;
 measuring electrodes positioned on the wristband.

According to embodiments, the device according to the invention may comprise a control interface arranged so as to allow the detection of control objects in contact with or across from at least one external detection zone and on the periphery of the display zone, via measurements from measuring electrodes superimposed on the display zone.

According to the embodiments, the device according to the invention may comprise a control interface arranged so as to allow the detection of movements or positions of a control object corresponding to a hand attached to a wrist to which the device is attached, for measurements coming from:
 measuring electrodes superimposed on the display zone, and/or
 measuring electrodes positioned on the case outside the display zone.

According to the embodiments, the device according to the invention may further comprise at least one of the following elements:

an inclinometer,
an accelerometer,
a light sensor,
a microphone,
a speaker,
a physiological signal sensor.

The device according to the invention may in particular be of the wristwatch type.

According to the embodiments:
the device according to the invention may further comprise wireless connecting means allowing data exchanges with a second electronic device;
it may be arranged so as to be able to be used as a remoted interface for the second electronic device;
it may be arranged so as to be able to be used as a remoted interface for a second electronic device of smartphone or tablet type.

According to another aspect, a control method is proposed for an electronic device intended to be worn secured to part of the human body (such as a wrist), comprising a case provided with a display zone, a wristband, and a control interface with capacitance-measuring electrodes arranged to detect control objects in a measuring vicinity,
the method comprising the following steps:
looking for control objects in contact with or across from the display zone,
looking for control objects in contact with or across from at least one other detection zone outside said display zone,
generating a command.

According to implementations, the method according to the invention may further comprise:
a step for generating a command depending on a movement of a control object relative to an external detection zone located on the case or on the wristband.
a step for generating a command depending on the position or a movement of a control object corresponding to a hand attached to a wrist to which the device is attached.
a step for taking into account the spatial orientation of the device for generating a command,
a step for taking into account a light environment of the device for generating a command.

DESCRIPTION OF THE FIGURES AND EMBODIMENTS

Figure 2:
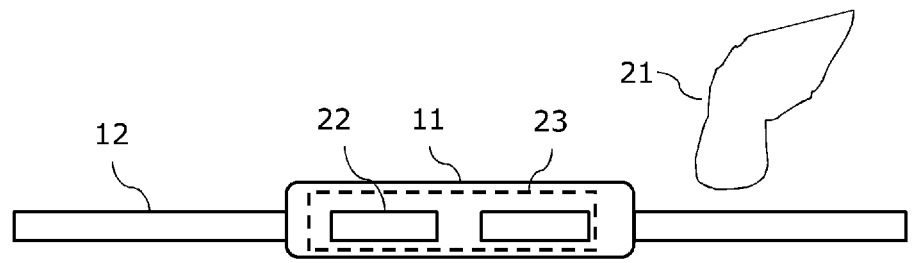
Figure 3:
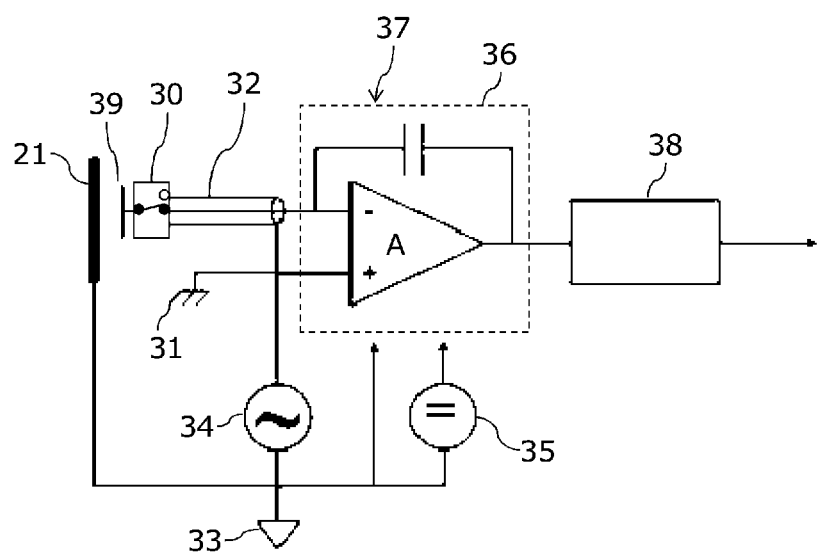
Figure 4:
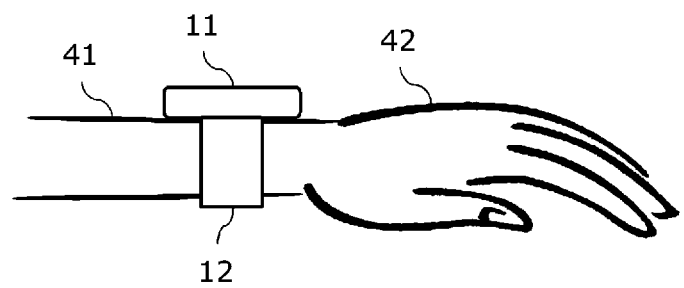
Figure 5:
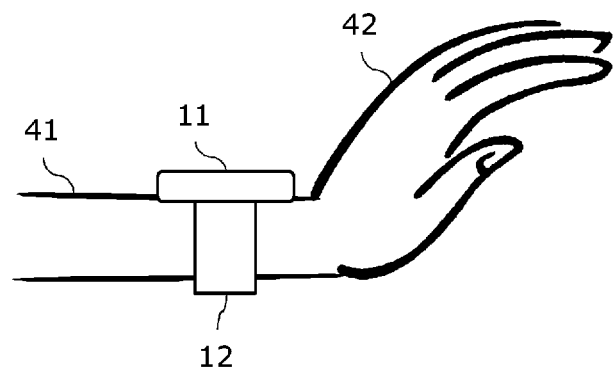

Other advantages and particularities of the invention will appear upon reading the detailed description of non-limiting implementations and embodiments, and the following appended drawings:

FIG. 1 illustrates an embodiment of the device according to the invention in top view, FIG. 2 illustrates an embodiment of a device according to the invention in side view, FIG. 3 shows an embodiment of detection electronics for the control interface of a device according to the invention, FIG. 4 illustrates a device according to the invention worn on the wrist with the hand in a neutral position, FIG. 5 illustrates a device according to the invention worn on the wrist with the hand in a raised position.

It is well understood that the embodiments which will be described in the following are in no way limiting. One could in particular imagine variants of the invention only comprising a selection of features subsequently described isolated from other features described, if this selection of features is sufficient to confer a technical advantage or for distinguishing the invention from the state of the prior art. This selection includes at least one preferably functional feature without structural details, or with only a portion of the structural details, if this part alone is sufficient to give a technical advantage or to distinguish the invention compared to the state of the prior art.

In particular, all the variants and all the embodiments described can be combined with each other if at the technical level nothing prevents it.

In the figures, the elements common to several figures retain the same reference.

In reference to FIG. 1 and FIG. 2, in the illustrated embodiment, the device according to the invention globally has the shape of a wristwatch intended to be worn around the wrist.

It is well understood that the term "wristwatch" is in no way limiting and is used essentially to illustrate an analogous shape.

In the described embodiment, the device according to the invention is particularly a mobile terminal intended to be used as a satellite interface of a primary apparatus such as a smartphone or a tablet.

It can be connected by wireless link, for example of the WiFi or Bluetooth type, to the primary apparatus.

It thus makes it possible to offload certain functionalities of the primary apparatus so as to be able to access them without having to interact directly with the primary apparatus, as will be detailed later.

The device according to the invention comprises a case 11. This case comprises a display zone 13 in the form of a display screen 13.

The device according to the invention also comprises a wristband 12 that makes it possible to fasten or maintain it securely on part of the body 11. In the described embodiment, this wristband 12 makes it possible to fasten the device to the wrist.

The device according to the invention comprises a control interface with capacitance-measuring electrodes arranged to detect control objects 21 in contact with a surface of the device, or in the vicinity of its surface (therefore at a nonzero distance). This control interface allows the user to control the device by interacting with the measuring electrodes.

The measuring electrodes are distributed on the device so as to constitute detection zones in contact with or across from which control objects can be located. These detection zones correspond to surfaces of the device.

The device comprises a detection zone superimposed on the display screen 13, and external detection zones located on the case 11 and/or on the wristband 12, as will be explained later.

The display screen 13 is made in the form of a touch-sensitive pad. It comprises capacitive electrodes 16 on its surface that make it possible to detect the presence of a control object 21 such as a finger 21 in the detection zone corresponding to the display screen 13.

These electrodes 16 constitute a control interface that allows the user to control the device by interacting with the display 13.

They are made from a substantially transparent conductive material, for example ITO (indium-tin oxide) deposited on a dielectric material (glass or polymer). They are superimposed on a display screen 13, for example of the TFT (thin-film transistor) or OLED (organic light-emitting diode) type.

This type of human-machine interface is well-known and widely used in smart phone or tablet type systems.

However, in the present case, the screen 13 is small, with a diagonal of about 5 cm or less. Under these conditions, the use of the touch-sensitive interface with a finger 21 is awkward, since the zones to be targeted are necessarily small. Furthermore, bringing the finger 21 closer conceals a large part of the display 13.

In the embodiment shown in FIG. 1 and FIG. 2, the device according to the invention also comprises external capacitance-measuring electrodes outside the display zone 13.

These electrodes are for example made by depositing metal, or any appropriate method.

FIG. 1 and FIG. 2 show non-limiting examples of the arrangement of these external measuring electrodes. They can comprise:

- electrodes 14 positioned on the upper face of the case around the display 13, in particular on the sides toward the wristband 12 and on the perpendicular sides;
- electrodes 22 positioned on one or more edges of the case, in particular on an edge parallel to the wristband 12;
- electrodes 15 positioned on the wristband 12.

The electrodes 15 positioned on the wristband 12 define an external detection zone 17 of the wristband.

The electrodes 14, 22 positioned on the case define one or a plurality of external detection zones of the case 18.

In one preferred embodiment, electrodes 16 of the periphery of the screen 13 are used to detect control objects 21 in external detection zones of the case 18. Indeed, these capacitive electrodes 16 of the edge are sensitive to the presence of control objects 21 past the boundaries of the screen 13. By comparing measurements thereof with those obtained with electrodes 16 located more toward the inside of the screen 13, it is possible to determine that a detected control object 21 is found in an external detection zone of the case 18, and not over the screen 13. This detection mode can be called detection by edge effect.

In this case, the device according to the invention may not comprise external measuring electrodes 14, 22 on the case.

The device may further be arranged such that there is continuity between the external detection zones 17 of the wristband 12 and detection zones 18 of the case 11.

These external detection zones 17, 18 (implemented via external measuring electrodes 14, 15, 22 and/or the use of detection by edge effect with electrodes 16 of the periphery of the screen 13) make it possible to develop control modes of the device more suitable for small size thereof, as will be explained later.

In reference to FIG. 3, we will now describe an embodiment of detection electronics making it possible to produce a control interface.

In this embodiment, the capacitive electrodes 39 (which correspond to the measuring electrodes 16 of the screen 13 and/or the external measuring electrodes 14, 15, 22) make it possible to detect the presence and/or measure the distance of at least one control object 21 in a measuring zone. Preferably, the measuring electrodes 39 and the electronics associated therewith are configured so as to allow the simultaneous detection of several control objects 21.

The position of the control object(s) 21 relative to the device is determined from the position of the measuring electrodes 39 that detect these control objects 21.

The distance, or at least information representative of this distance, between the control object 21 and the electrodes 39 is determined from capacitive coupling measurements between these electrodes 39 and the control objects 21.

This embodiment makes it possible to obtain a sufficient measuring sensitivity to be able to detect and locate control objects 21 in contact with the surface of the device or electrodes 14, 15, 16, 22, or that progress near the device at a nonzero distance from its surface.

It should also be noted that the presence of external electrodes 14, 15, 22 makes it possible to increase the remote control possibilities of the device due simply to the fact that they define a measuring zone with dimensions larger than that of the display screen 13. Indeed, this makes it possible to extend the possibilities for three-dimensional remote measurements above the active surface (x, y, z coordinates of the finger(s) or the hand 21).

Guard elements in the form of guard electrodes or guard planes (not shown) are positioned along the rear face of the measuring electrodes 39, relative to the detection zone of the control objects 21. These guard elements serve to avoid parasitic electric couplings between the measuring electrodes 39 and their environment, as will be explained later.

In the case of the display screen 13, the guard elements are also made from a substantially transparent conductive material, for example ITO (indium-tin oxide). They are separated from the measuring electrodes 16 by a layer made from a dielectric material.

The measuring electrodes 39 are connected to electronic capacitance-measuring means 37.

These electronic capacitance-measuring means 37 are made in the form of a floating bridge capacitance-measuring system as for example described in the Rozière patent FR 2,756,048.

The detection circuit comprises a so-called part referred to as floating 36 whose reference potential 31, called guard potential 31, oscillates relative to the bulk ground 33 of the global system, or the ground. The alternating potential difference between the guard potential 31 and the bulk ground 33 is generated by an excitation source, or an oscillator 34.

The guard elements are connected to the guard potential 31.

The floating part 36 comprises the sensitive part of the capacitive detection, shown in FIG. 3 by a charge amplifier. It may of course comprise other means for processing and conditioning the signal, including digital or microprocessor based, also referenced to the guard potential 31. These processing and conditioning means for example make it possible to compute distance and pressure information from capacitance measurements.

The power supply of the floating part 36 is provided by floating power supply means 35, for example comprising DC/DC converters.

This capacitance-measuring system makes it possible to measure capacitance information between at least one measuring electrode 39 and a control object 21.

The control object 21 must be connected to a potential different from the guard potential 31, such as the bulk-ground potential 33. This configuration is indeed found when the control object 21 is a user's finger whose body defines a ground, or an object (as well as a stylus) manipulated by that user.

A set of switches or analog switches 30, controlled by electronic control means, makes it possible to select a measuring electrode 39 and connect it to the capacitance-detection electronics 37 to measure the coupling capacitance with the object 21. The switches 30 are configured such that a measuring electrode 39 is connected either to the capacitance-detection electronics 37, or to the guard potential 31.

The sensitive part of the detection is protected by a guard shielding 32 connected to the guard potential 31.

Thus, a measuring electrode 39 connected by a switch 30 to the capacitance-detection electronics 37 (or active measuring electrode 39) is surrounded by guard planes made up at least in part of inactive measuring electrodes 39 and guard elements connected to the guard potential 31.

Since the active measuring electrode 39 is also at the guard potential 31, one thus avoids the appearance of parasitic capacitances between this electrode and the environment thereof, such that only the coupling with the object of interest is measured with a maximum sensitivity.

The floating electronics 36 are connected at the output to the electronics of the system 38 referenced to the bulk ground by electrical connections compatible with the difference in reference potentials. These connections can for example comprise differential amplifiers or optocouplers.

The switches 30 thus make it possible to sequentially poll or query the measuring electrodes 16 of the screen 13, as well as the external measuring electrodes 14, 15, 22.

Of course, several channels of the capacitance-detection electronics 37 can be implemented in parallel, each controlling a subset of electrodes 39. It is for example possible to implement one channel of the capacitance-detection electronics 37 to control the electrodes 16 of the screen 13 and one channel of the capacitance-detection electronics 37 to control the external electrodes 14, 15, 22.

We will now describe example embodiments of commands or controls for devices according to the invention that more specifically use the external electrodes 14, 15, 22.

Of course, these embodiments are non-limiting examples.

Furthermore, all of the known commands or interaction modes that implement the measuring electrodes 16 of the screen 13 can also be implemented in the invention.

According to a first aspect, the external detection zones 17, 18 (optionally with their external electrodes 14, 15, 22) are used to remote, outside the display zone 13, commands or actions that are normally done by interacting with electrodes 16 of the screen 13. This in particular has the advantage of:

avoiding concealing the display with the finger 21 during an action;

avoiding consuming display surface for example to show virtual buttons with a sufficient size to allow targeting with the finger 21.

According to one implementation, a control method of the device may comprise the following steps:

detecting a "tap" in at least two external detection zones 140, 141 of the face of the case 11 (these external detection zones 140, 141 could correspond to external electrodes 140, 141 or to be defined from the detection of edge effects by electrodes 16 of the screen 13);

incremental movement 23 of a cursor or of a selection zone and/or an incremental scrolling of elements on the screen 13 in the direction defined by the electrode 140, 141 on which the tap was detected. A two-dimensional movement can also be obtained with four electrodes.

The elements can for example be pieces of music, e-mails, text messages, etc. The cursor and/or the elements can also be levels, for example for listening to audio.

It is thus easily possible to view the elements when they are scrolled.

According to one implementation, a method for controlling the device may comprise a step for selecting or viewing an element by performing a tap on an external detection zone 142 of the face of the case 11. As before, the external detection zone 142 can correspond to an external electrode 142 or be defined from the detection of edge effects by electrodes 16 of the screen 13.

According to one implementation, a method for controlling the device may comprise the following steps:

detecting a movement 19 of the control object 21 along an external detection zone 17 of the wristband 12 (for example defined by a plurality of measuring electrodes 15 distributed along the wristband 12). According to implementations, the control object 21 can be in contact with or at a distance from the surface of the external protection zone 17;

for moving 20 a cursor or a selection zone and/or scrolling elements on the screen 13 as a function of the movement 19 of the control object 21.

According to a second aspect, special commands specific to the nature of the device can be implemented by using the external detection zones 17, 18.

In reference to FIG. 4 and FIG. 5, according to one implementation, a method for controlling the device may comprise steps for detecting particular positions of the hand 42 attached to the wrist 41 around which the device is fastened.

This detection can for example be achieved by using the detection of edge effects by the electrodes 16 of the screen 13.

It may also be done with external electrodes 22 positioned on the edge of the case 11 that faces the hand 42, or with electrodes 14 of the face of the case that have an appropriate sensitivity and orientation.

Thus, for example:

the detection of a raised position of the hand 42 as illustrated in FIG. 5 can be used to turn-off an alarm or answer an incoming call;

it is possible to identify on which side of the device the hand 42 attached to the wrist 41 around which it is fastened is located, in particular to adapt the display, it is possible to distinguish whether the device is worn on a left or a right hand by locating the side of the thumb, in particular to adapt the display or functions of the control interface.

According to embodiments, the device according to the invention may comprise a sensor sensitive to the position or inclination thereof. This sensor can be used to modify the controls assigned to the detection zones of the screen 13 and/or to the external detection zones 17, 18. For example:

the interface can be blocked if the device is in a position with the screen 13 vertical;

a movement of the hand 42 can be interpreted differently depending on whether the device is in a position corresponding to that of a vertical arm hanging along the body.

According to embodiments, the device according to the invention can comprise a light sensor, for example to determine whether it is in a sleeve.

In this case, it is for example possible to adjust the sensitivity of certain measuring electrodes to allow the detection of control objects 21 at a larger distance, through a piece of clothing.

According to the embodiments, the device according to the invention can be an autonomous apparatus that can operate without depending on a connection to another so-called "primary" apparatus.

According to embodiments, the device according to the invention may in particular comprise:

a watch, a computer, a telephone, a device for measuring or monitoring physiological signals, such as pulse, blood pressure, etc.

According to embodiments, the device according to the invention can be arranged so as to be worn on any location of the body, in particular including:
an arm,
a leg or an ankle,
the trunk or torso.

According to the embodiments, the device according to the invention can comprise elements such as the case 11, and/or part of the wristband 12 supporting external measuring electrodes 15 that are arranged so as to be able to separate from the wristband 12.

Of course, the invention is not limited to the examples which were just described and many improvements could be made to these examples without leaving the scope of the invention.

The invention claimed is:

1. An electronic device, comprising:
   a case provided with a display zone, the case at least partially surrounding the display zone,
   a wristband, and
   a control interface with capacitance-measuring electrodes distributed on the device so as to form detection zones and arranged to detect control objects, the electrodes distributed in both an edge region within the display zone and in an interior region within the display zone, the electrodes in the interior region within the display zone being closer to a center of the display zone than the electrodes in the edge region within the display zone,
   wherein said capacitance-measuring electrodes are arranged so as to allow a detection of control objects:
      in contact with a detection zone superimposed on the display zone, and
      in contact with or above at least one zone on the case outside said display zone by comparing measurements received at about the same time from an electrode located in the edge region within the display zone and an electrode located in the interior region within the display zone.

2. The device according to claim 1, further comprising capacitance-measuring electrodes positioned on the case outside the display zone.

3. The device according to claim 1, further comprising capacitance-measuring electrodes positioned on the wristband.

4. The device according to claim 1, further comprising at least one guard element referenced to the capacitance-measuring electrodes and different from system ground, the at least one guard element for shielding the capacitance-measuring electrodes.

5. The device according to claim 1, the control interface arranged so as to allow the detection of movements or positions of a control object corresponding to a hand attached to a wrist to which the device is attached, for measurements coming from:
   measuring electrodes superimposed on the display zone, or
   measuring electrodes positioned on the case outside the display zone.

6. The device according to claim 1, further comprising at least one of the following elements:
   an inclinometer,
   an accelerometer,
   a light sensor,
   a microphone,
   a speaker, and
   a physiological signal sensor.

7. The device according to claim 1, wherein the device is a wearable device.

8. The device according to claim 1, further comprising wireless connecting means configurable for allowing data exchanges with a second electronic device.

9. The device according to claim 8, wherein the device is configurable as a remoted interface for the second electronic device.

10. The device according to claim 8, wherein the device is configurable as a remoted interface for the second electronic device of smartphone or tablet type.

11. A control method for an electronic device comprising a case provided with a display zone, the case at least partially surrounding the display zone, a wristband, and a control interface with capacitance measuring electrodes distributed on the device so as to form detection zones and arranged to detect control objects in a measuring vicinity, the method comprising:
   detecting one or more control objects in contact with or above at least one zone on the case outside said display zone by comparing measurements received at about the same time from an electrode located in an edge region within the display zone and an electrode located in an interior region within the display zone, and
   generating a command based on the detection of the one or more control objects.

12. The method according to claim 11, further comprising generating a command depending on a movement of a control object relative to an external detection zone located on the case or on the wristband.

13. The method according to claim 11, further comprising generating a command depending on a position or a movement of a control object corresponding to a hand attached to a wrist to which the device is attached.

14. The method according to claim 11, further comprising generating the command based on a light environment of the device.

15. The method according to claim 11, further comprising shielding at least one of the capacitance measuring electrodes using at least one guard element referenced to the capacitance measuring electrodes and different from system ground.

16. The method according to claim 11, further comprising simultaneously detecting a plurality of control objects.

17. The device according to claim 1, the capacitance-measuring electrodes configured for simultaneous detection of a plurality of control objects.

* * * * *